Dec. 16, 1941.                M. B. BECK                2,265,992
                               PROJECTOR
                          Filed Nov. 2, 1938           4 Sheets-Sheet 1
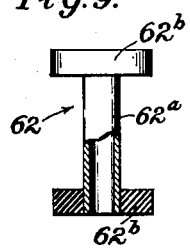
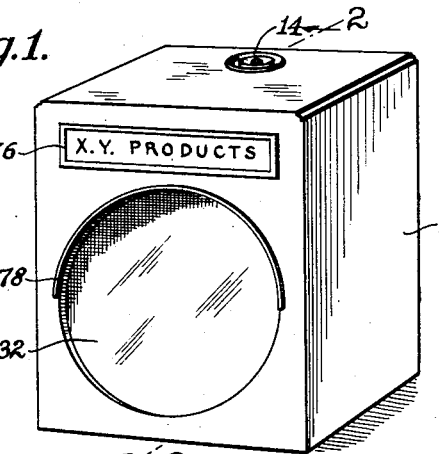
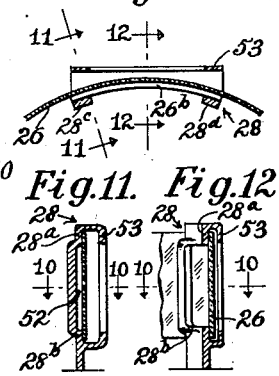
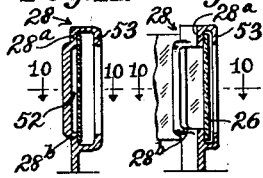
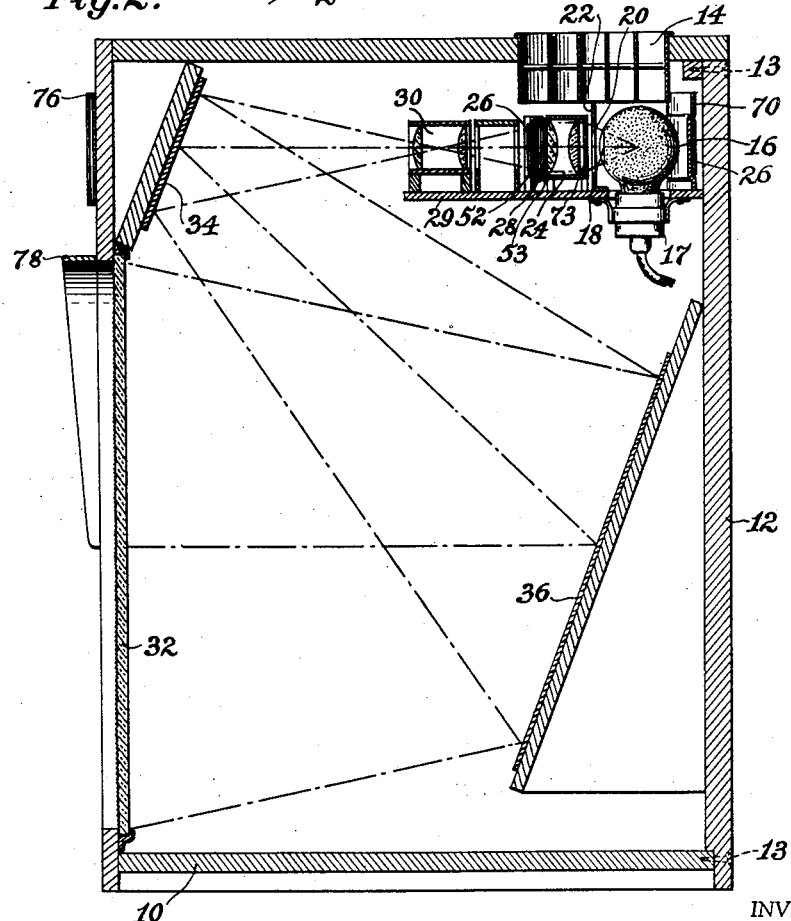
INVENTOR.
Morris B. Beck.
BY
ATTORNEYS Dec. 16, 1941.　　　　M. B. BECK　　　　2,265,992
PROJECTOR
Filed Nov. 2, 1938　　　　4 Sheets-Sheet 2
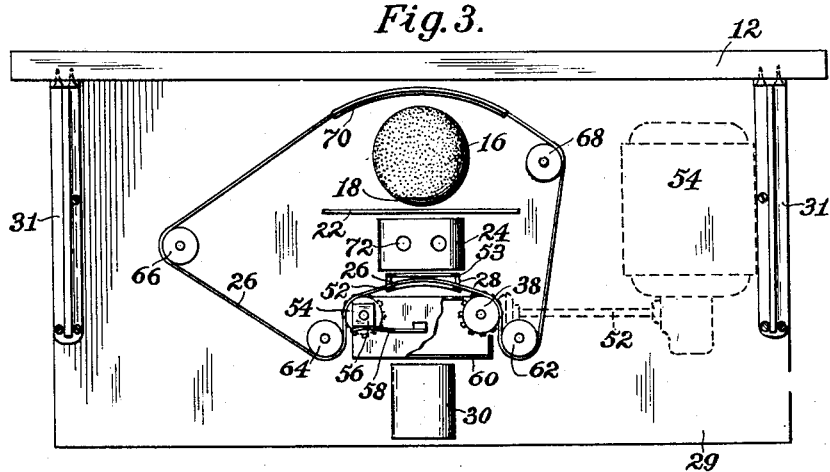
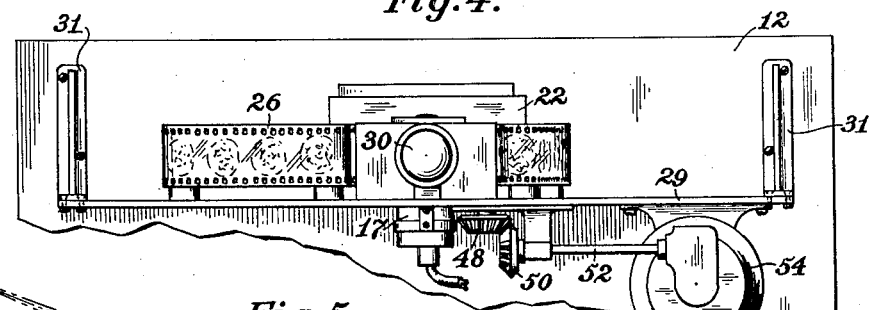
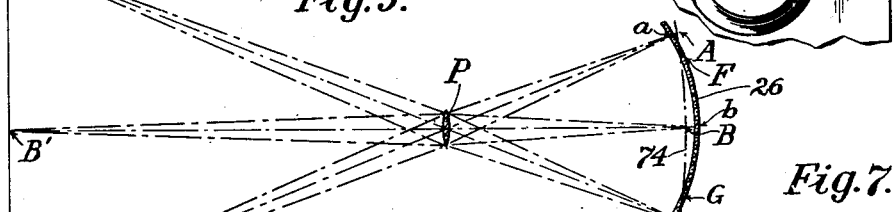
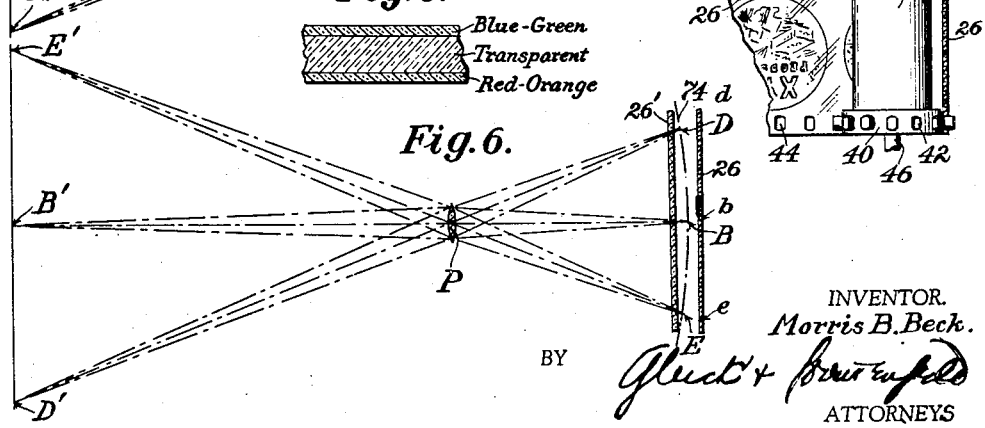
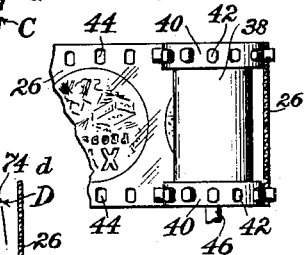
INVENTOR.
Morris B. Beck.
BY
ATTORNEYS

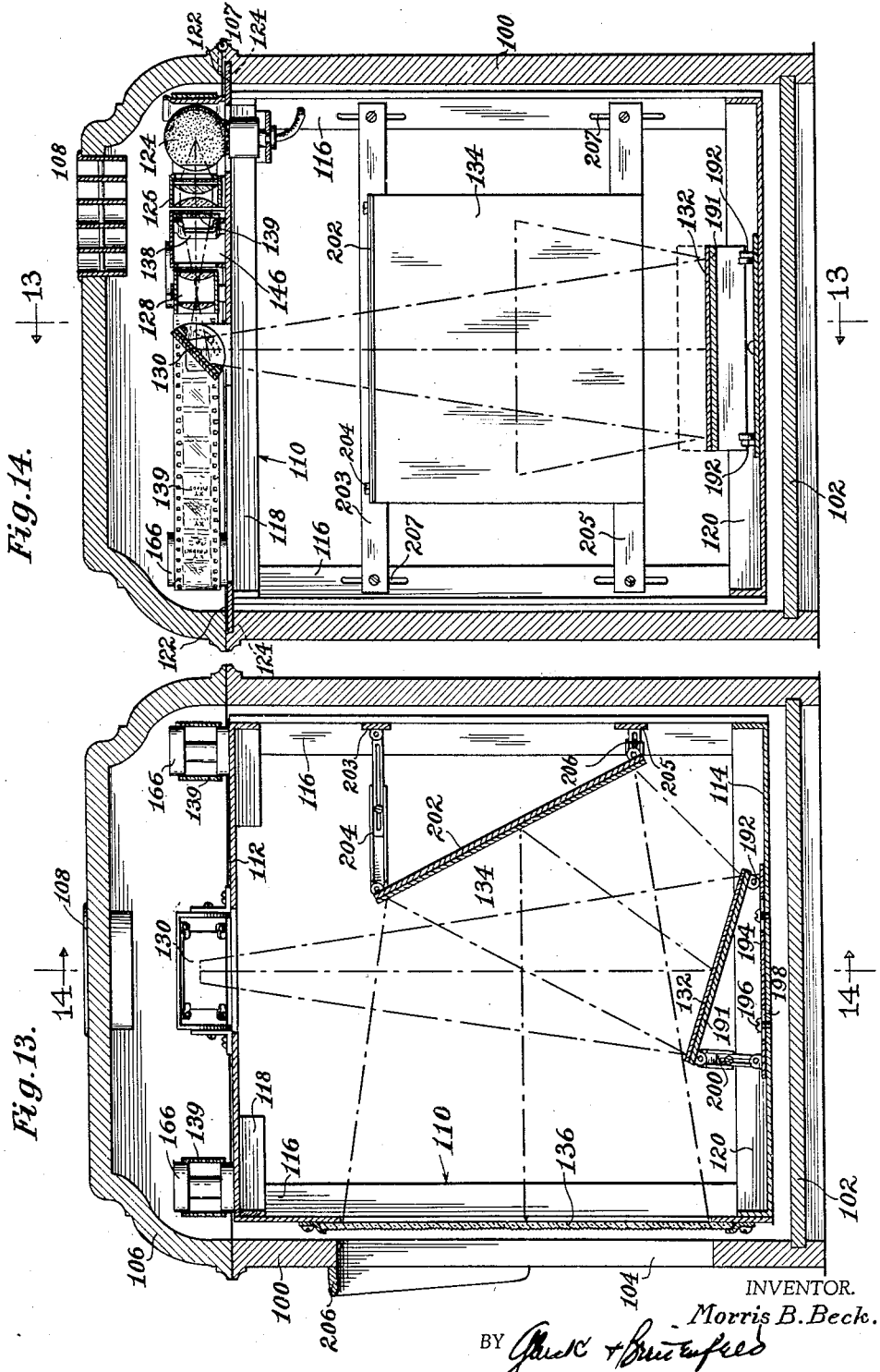

Dec. 16, 1941.    M. B. BECK    2,265,992
PROJECTOR
Filed Nov. 2, 1938    4 Sheets-Sheet 4
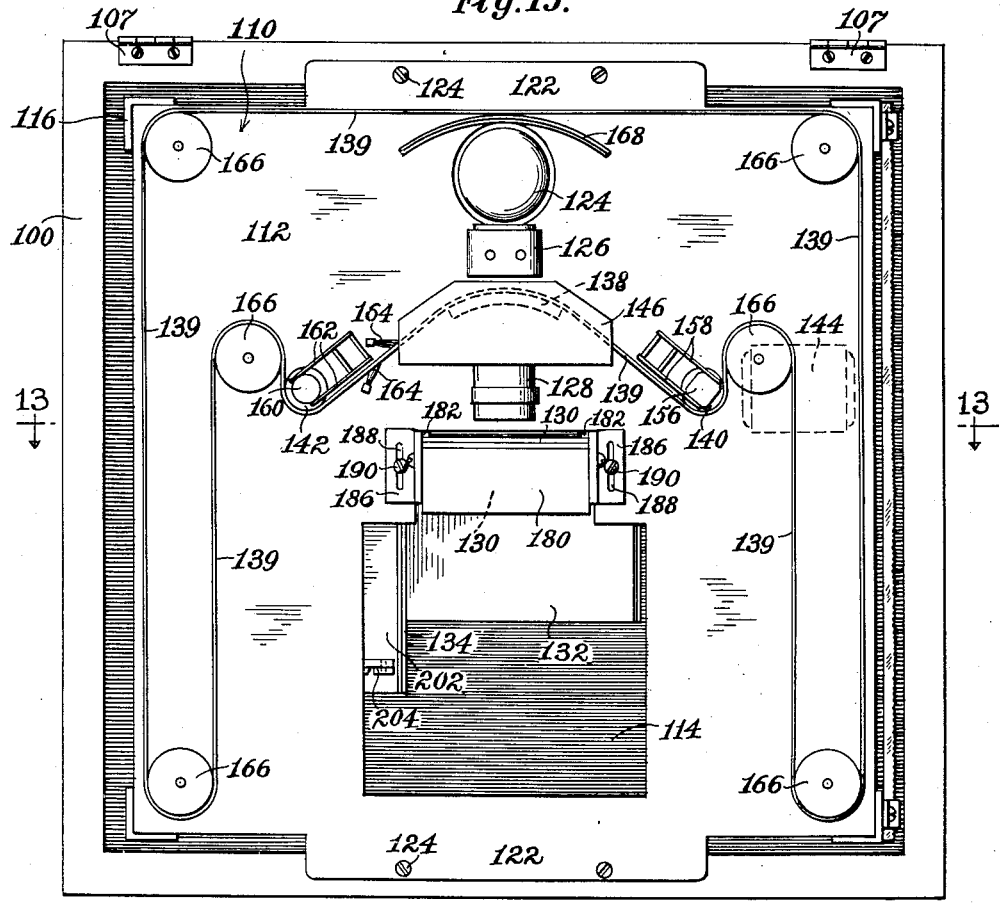
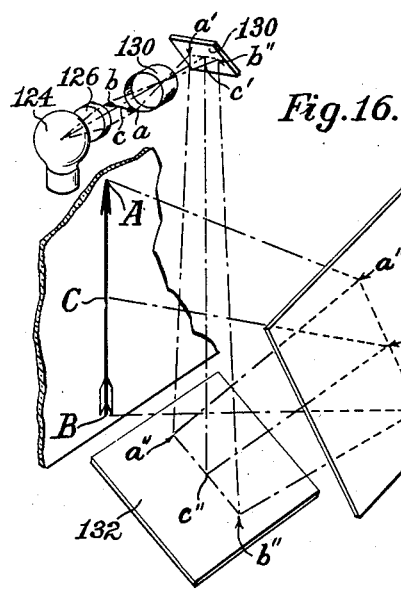
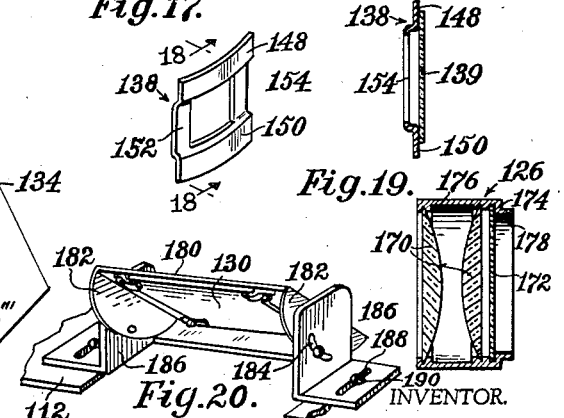
INVENTOR.
Morris B. Beck
BY Gluck + Brittenfeld
ATTORNEYS Patented Dec. 16, 1941

2,265,992

UNITED STATES PATENT OFFICE 2,265,992

PROJECTOR

Morris B. Beck, Lawrence, N. Y.

Application November 2, 1938, Serial No. 238,329

13 Claims. (Cl. 88—24)

This invention relates generally to projectors, that is to optical arrangements for forming an image of an object on a screen, and more particularly it relates to a self-contained unit including a screen on which a series of pictures are thrown in succession and at predetermined intervals. Such a projector is particularly convenient and useful for advertising purposes.

The general objects of my invention are the provision of a projector of the character described that is simple, compact, efficient and low in manufacturing and maintenance costs.

More particularly my invention contemplates the provision of a self contained projector having its parts compactly arranged and readily accessible and in which a closed loop of film having a series of panels thereon is automatically moved so that the panels are automatically and successively moved into a position in which an enlarged image thereof is projected on the screen of the projector.

Among the more particular objects of my invention are also the provision in a projector of means for controlling the contours of a projector film so that it will be more nearly free from undesirable distortion, the provision in a projector of means for guiding a projector film without injuring the picture panels thereof, the provision in a projector of means for positioning a projector film in relation to the projector lens so as to secure clearness and definition even with an inferior grade of lens, and the provision in a projector of a condenser for securing adequate illumination of the film that will at the same time protect the film against the harmful effects of excessive heat from the source of light.

These objects and such other objects as will hereinafter appear or be pointed out are attained in the illustrative embodiments of my invention shown in the drawings, in which:

Figure 1 is a perspective view of my improved projector;

Figure 2 is a sectional view on an enlarged scale substantially on the line 2—2 of Figure 1, looking in the direction of the arrows;

Figure 3 is a plan view of the film guiding mechanism, the illuminating system and a portion of the projecting system;

Figure 4 is a front elevational view of the parts shown in Figure 3;

Figures 5 and 6 are diagrammatic sectional views illustrating the positioning of the film relatively to the projecting lens, the former being a view in a horizontal plane, the latter a view in a vertical plane;

Figure 7 is a detail view of one of the power driven sprocket wheels serving to advance the film, together with a portion of the film, and is illustrative of the manner in which the film contacts with the sprocket wheel;

Figure 8 is a transverse sectional view, on a greatly enlarged scale, through a portion of a film such as I may employ to advantage in my projector;

Figure 9 is an elevational view of one of the guiding rollers over which the film is led, portions being broken away to disclose its construction;

Figure 10 is a horizontal plan view of the gate taken substantially on the line 10—10 of Figures 11 and 12, looking in the direction of the arrows;

Figures 11 and 12 are respectively vertical sectional views, taken substantially on the lines 11—11 and 12—12 of Figure 10, respectively looking in the direction of the arrows;

Figure 13 is a sectional view of a second embodiment of my invention taken substantially on the line 13—13 of Figures 14 and 15, looking in the direction of the arrows;

Figure 14 is a sectional view taken substantially on the line 14—14 of Figure 13, looking in the direction of the arrows;

Figure 15 is a plan view on an enlarged scale of the embodiment of Figure 13, with the cover removed so as to expose the interior thereof;

Figure 16 is a diagrammatic view in perspective showing the optical system of the embodiment of Figure 9;

Figure 17 is a view in perspective of the gate serving to conduct the film;

Figure 18 is a cross sectional view taken substantially on the line 18—18 of Figure 17 looking in the direction of the arrows, and showing the film in contact with the gate;

Figure 19 is a transverse sectional view through the condenser of the embodiment of Figure 13; and Figure 20 is a perspective view of the mounting of one of the mirrors of the embodiment of Figure 13.

Briefly my invention may be stated to comprise a casing within which are accommodated all of the working parts of the projector, which include a projecting screen and a projecting lens together with a system of reflectors whereby an optical distance between the screen and the projector is greatly increased, while the dimensions of the casing are kept relatively small. The parts of the projector include further a power driven guide system for a film of the endless or loop type having a series of picture panels thereon that are intermittently projected on the screen, the changing of one picture panel to another being effected automatically at predetermined intervals, and an illuminating system whereby the pictures to be projected are sufficiently illuminated for projection purposes.

Referring now to Figures 1 to 12 inclusive for a detailed description of the first illustrative embodiment of my invention, the numeral 10 therein designates the casing of my projector, which is shown as provided with a back panel 12 carrying the illuminating and film guiding and advancing systems and the greater portion of the projecting system. For the purpose of permitting ready removal of the panel 12, it is shown as attached to the casing by means such as screws 13. This construction permits ready access to the parts of my projector.

Ventilation to prevent overheating is provided by a chimney 14 seated on the upper portion of the casing and having concentric tubular portions or baffles suitably supported therein and serving to freely permit the passage of air therethrough while restricting the passage of stray light.

Illumination is shown as provided by an incandescent bulb 16 suitably supported, as in a socket 17. This bulb may be of the projector type having its outer surface silvered except for a clear window 18, so that substantially all of its light is emitted through the window in a narrow pencil or beam, which passes through an opening 20 in a screen 22 and into a condenser 24 which directs the light against the film, designated by numeral 26, while the film is passing through a gate 28. All of these parts are suitably mounted on the back 12 of the casing; for this purpose a platform 29 may be provided on the panel and suitably secured thereto as by brackets 31, and to this platform the various parts may be conveniently attached.

The details of the gate 28 are shown in greater detail in Figures 10, 11 and 12. On viewing these figures it will be observed that the gate 28 comprises a pair of guide portions 28a and 28b adapted to engage the upper and lower edges of the film respectively. These guide portions are curved in a horizontal plane and they are shown connected by laterally positioned straps 28c and 28d, which however are offset so that they do not touch the surface of the film.

The advantages of restricting the contact surface of the film with the sprocket wheel will be obvious, particularly where a color film of the type shown in section in Figure 8 is used. Such a film has a sensitive surface on each side thereof. As illustrated, a blue-green sensitive layer is positioned on one side of a transparent film, and a red-orange layer on its other side, the two layers coacting to give an image in true colors. It will be apparent that with such a film, in which both surfaces have a sensitive coating, the contact of such coating with a guiding surface is apt to result in injury thereto.

By the use of my improved gate all possibility of injury to the image-bearing portions of the film is prevented, since contact occurs only at the edges of the film, which are inactive for image-producing purposes.

It will further be observed that the curvature given to the film by the curved guide portions, serves to cause it, due to the elasticity of the film, to assume a contour that is curved in a horizontal plane and that is straight in a vertical plane, when the film is drawn thereover under tension. This assures a conformation of the film that is free from distortion, and is therefore instrumental in securing improved optical performance.

A rear panel 53 has been shown associated with the gate 28. This is positioned intermediate the gate and the condenser 24, and is provided with an aperture registering with the aperture 52 in the gate.

After passing through the film 26 the light is received by the projector lens system 30 which throws an enlarged image of the film on a projection screen, designated by the numeral 32, and positioned in a wall of the casing so as to constitute a part thereof. It will be understood that the lens system 30 is adjustably mounted to secure proper focusing. The screen 32 is translucent and of such character that when an image is thrown on the inside thereof, such image will be visible from the outside of the casing. For this purpose it may, by way of example, be made of glass or the like having a finely divided semi-prismatic surface on its outside and a ground surface on its inside. I have found screens of this type to give excellent results in actual practice.

In order to permit sufficient enlargement of the image without increasing the dimensions of the casing or using a wide angle lens, which latter would entail increased cost and would not give as satisfactory results, a system of reflectors is provided from the surfaces of which the image forming rays are reflected. Two such reflectors are shown, one designated by the numeral 34 being positioned on the front wall of the casing, receiving the rays from the projecting lens 30 and transmitting them to a reflector on the casing. From the reflector 36 the rays are transmitted to the screen 32.

The guiding and advancing system for the film, also carried by platform 29, comprises a system of sprocket wheels is intermittently power driven, the intervals between its movements serving for display of the film, which is then stationary.

The power driven sprocket wheel is shown at 38 in Figures 3 and 7. From the latter figure it will be observed that it is provided with a pair of rims 40 at both ends thereof, these rims being shown as having pins or sprockets 42 arranged thereon, the latter being adapted to fit into openings 44 arranged on the marginal portions of the film throughout its length. This arrangement serves to effect engagement of the film so that when the sprocket wheel 38 turns the film is moved.

It will be observed that the rims 40 are raised above the body portion of the sprocket wheel, whereby the film as it passes over the wheel is only engaged by the rims, and its intermediate portions in which the picture panels are located does not come into contact with the sprocket wheel at all. Due to the elasticity of the film as it is curved in its passage over the sprockets, it assumes a straight transverse section, and therefore passes smoothly over the sprocket wheel, with contact therewith only at its rim portions.

The sprocket wheel 38 is mounted on a shaft 46, which is shown as carrying a bevel gear 48 at its lower end. In mesh with gear 48 is shown a mutilated gear 50 having a portion of its teeth cut away so as to cause intermittent movement of the gear 48. The gear 50 is mounted on a shaft 52 shown as driven, through suitable reduction gearing, from a motor 54. Both shaft 52 and motor 54 are shown as mounted on the under side of platform 29.

By means of the arrangement just described the sprocket wheel is turned so as to advance the film one panel at a time and the film stays in this position until the rotation of gear 50 carries it into a position in which it again advances the film. This advancing occurs once during each revolution of shaft 52. By way of example I may state that in actual practice I have satisfactorily used sixteen teeth on gear 48, while gear 50, which is pitched for twenty teeth has all but three of the teeth cut off. I have found that during each revolution of gear 50 the gear 48 advances one quarter turn when the teeth of gear 50 mesh with the teeth of the bevel gear 16. The gear 48 then stands still during the remainder of the revolution of gear 50, and the film 26 is so positioned relatively to the sprockets that during the time that the gear 48 and the sprocket wheel 38 stand still, one of the picture panels of the film 26 will be in registration with the openings in the gate 28 and with the projecting lens 30.

The gate 28 is positioned between the sprocket wheel 38 and an idler sprocket wheel 54, the latter being mounted for rotation on the platform 29 and having in fixed relation thereto a braking arrangement comprising a cam 56 carried by the sprocket wheel 54, against which is shown pressing a leaf spring 58 suitably supported on a housing 60 that is positioned intermediate the gate 28 and the projector 30 and is provided with suitable apertures permitting the passage of image forming rays from the film into the projector. This housing also serves as a support for the sprocket wheels 38 and 54.

The cam 36 is shown as provided with flat surfaces, and these are so positioned in relation to the sprocket wheel 38 that whenever the latter comes to rest the spring 58 will rest against one of these flat surfaces. This arrangement has the effect that the cam 56 acts as a positioning means for the film, being so related to the latter that in any one of the rest positions thereof mentioned hereinabove, one of the picture panels of the film is in registration with the aperture in the gate. For example where gear 48 moves one quarter of a turn at a time, the cam 54 will be square, as shown in the drawings.

The idler sprocket wheel 54 serves to resist the movement of the film and therefore effects the tensioning of the film when the same is advanced by the roller 38, and this assures a clinging of the film against the curved panel 52 of the gate and a correct conformation of its curvature to the curvature of the guiding portions of the panel.

A roller 62 is shown as forward of and to one side of the sprocket wheel 38, and a roller 84 is similarly positioned in relation to the idler sprocket wheel 54, these rollers serving to guide the film in the desired path. Other rollers 66 and 68 may also be provided, and a guide 70 for the film provided with a channeled portion adapted to receive the film is also shown. This guide is interposed in back of the lamp 16 and between it and the film 26, and serves to protect it against heat from the lamp as well as to guide the film.

The rollers may be constructed as shown in Figure 7, in which the roller 62 is shown as spool-shaped and provided with a tubular core 62a, that may be revolubly mounted on a pin, and may be provided with end pieces 62b serving to guide the edge portions of the film. These parts may be made of any suitable or preferred material; I have found metal for the core 62a and fiber for the end pieces 62b to be very satisfactory in practice.

The condenser 24 is shown as consisting of a suitable lens system mounted in a casing provided with ventilating openings 72. In order to protect the film 28 as it passes from the gate 28 from heat transmitted from the bulb 16 I may interpose means for absorbing heat. This may consist of a disc 73 of heat absorbing glass, carried by the condenser cell, in a position nearest the bulb 16. With one kind of glass that I have used for a disc of this character I have been able to absorb about 80% of the heat radiated from the bulb 16 to the condenser, while the light absorption is only about 20%.

The function of the curved panel 52 of the gate 28 in preventing distortion and injury to the film has already been alluded to. This curved panel has another function, which will now be explained in connection with Figures 5 and 6.

Projecting lenses are subject to various defects, one of which is that of spherical aberration, and correction of these defects, and particularly that of spherical aberration requires refinements of construction that greatly increases the cost of the projecting lens. It has been customary where it is desired to produce a projecting lens of relatively low cost to only partially correct the same, and my invention contemplates the use of a projecting lens system that is only partially corrected for spherical aberration, and therefore is comparatively low in cost.

Referring now to Figures 5 and 6 P indicates a projecting lens system represented as a single lens in order to simplify the drawing and the explanation.

Referring first to Figure 5, which is a diagrammatic plan view, the film is, as before, designated by the numeral 26, and it is shown as having a curved contour imparted to it by the panel 52 of the gate 28, as has been fully explained hereinabove. The dot and dash curve 74, containing the points A, F, B, G and C, indicates a section through a surface the points in which will be correctly focused on a flat screen such as is indicated at the left of the figure, and the point A of the curve is shown as having its image at A' on the screen, the point B at B', and the point C at C'. It will be observed that the curvature of the film is greater than the curvature of the dot and dash line 74, and that at its mid portion, as at the point b, the film is in back of the dot and dash line and, in particular, of its colinear point B, so as to be out of focus, while at its end portions, as at the points a and c, the film is in front of the dot and dash line and, in particular, in front of the colinear points A and C, and also out of focus. At the points F and G the film crosses the dot and dash line, and at these points the film is correctly in focus.

In Figure 6 is shown a vertical section through the film at its mid portion, and this section includes points d, b, e that are colinear with points D, B and E of the line 74 representing the surface of which the points are in focus. This last named surface it will be observed is in front of the film section shown.

The section designated by 28' corresponds to a vertical section through the film taken substantially so as to include the point c of Figure 5. All points of this section lie in front of the surface 74.

While it will therefore be apparent that the film 26 is out of focus at all points except those lying in a closed curve in which the film is intersected by the spherical surface represented by the dot and dash line 74. I have found in practice that when the film is so related to the lens, the resulting image on the projection screen is far more pleasing than where the film is guided in a plane, and the results are comparable if not superior to those obtained by expensive lenses used in conjunction with films positioned in the customary manner.

The embodiment of my invention just described requires the images on the film 26 to be positioned as shown in Figure 7, that is, with the top of the image positioned at one side of the film. The standard arrangement for films, however, involves an arrangement in which the images are formed across the film, so that to view the same in the correct position the film must be held so that its length extends up and down.

In the embodiment of my invention shown in Figures 13 to 20 inclusive, I have shown an arrangement in which the standard film can be used. This embodiment also comprises a number of other features that will appear as the description proceeds.

The projector of Figures 9 to 16 comprises in general a frame on which all of the operative parts including the screen are mounted and which frame together with the operative parts is adapted for insertion into the outer casing that comprises a top portion and a cover therefor. When it is desired, to inspect the projector, or to make repairs or alterations, the cover may be raised and the frame lifted out of the casing (after loosening it from the fastenings holding it therein) and such repairs, alterations or adjustments carried out with the greatest ease and convenience.

Referring now to Figures 9 to 16 in detail the numeral 100 designates the outer casing, which is provided with a bottom 102 so that it is completely enclosed except at the top and except for an opening 104 permitting a view of the screen from outside the casing. The numeral 106 designates a cover movable into a position in which the interior of the casing is accessible and adapted to seat on the same, so that together with the casing 100 it forms a closure which serves as a protection against dust and injury to the internal parts and also prevents the escape of stray light from the operating mechanism of the projector. The cover 106, may, if desired be adjustably held in place on the casing 100, as by a hinge 107. A chimney 108 similar to the chimney 14 of the first embodiment may be seated within the cover so as to permit the escape of heated air from the interior without permitting the escape of stray light.

The numeral 110 designates in general a frame that is shown by way of example as comprising a top plate 112 and a bottom plate 114, secured together in any suitable or preferred manner as by uprights 116 that may be of angled cross section and may be fastened to downwardly turned flanges 118 and 120 formed respectively on the top and bottom plates 112 and 114.

Portions of the upper plate 112 are left protruding laterally so as to form flanges 122 adapted to overlie the upper edge portions of the casing 100 and thereby support the frame 110 within the casing. The flanges 122 may as shown, be conveniently seated in the shallow recesses formed in the upper edges of the casing.

After it is properly seated, the frame may be secured to the casing in any suitable or preferred manner, as by the screws 124 passing through the flanges 122 and into the walls of the casing 100.

The optical system is shown as comprising an incandescent bulb 124 which may be of a type similar to the bulb 16, a condenser 126, a projector lens 128, a set of three mirrors 130, 132 and 134, and a screen 136. Between the condenser 126 and the lens 128 is shown a gate 138 over which the film 139 is conducted. The film guiding system comprises, as before, an intermittently driven sprocket wheel 140, an idler sprocket wheel 142 together with rollers and other features that will be pointed out in detail hereinafter, and it is actuated by a suitable motor 144. All of these parts are mounted on the frame 110.

The gate 138 is shown as mounted within a housing 146 which serves to protect the gate and the film against injury and dust. The gate is more particularly shown in Figures 17 and 18, from which it appears that its construction is similar to that of the gate 128. As clearly appears from Figure 17 in particular, it is a rectangular frame constituted by curved film guiding portions 148 and 150, united by offset portions 150 and 152, so that the film is in contact only with the curved portions 148 and 150, and is constrained thereby to assume a curved contour, free from distortion, as has already been explained in connection with the gate 28.

The intermittently driven sprocket wheel 140 and the other sprocket wheel 142 are positioned one on each side of the housing 146 and are so offset in relation thereto that they will cause the film to closely contact the guiding surfaces of the gate 130.

The driven sprocket wheel 140 has a cam 156 associated therewith which will hold it in predetermined positions during the periods when it is not driven. One or more springs 158 may bear the flat surfaces of the cam 156 to accomplish this function.

The idler sprocket wheel is similarly provided with a braking system comprising the drum 160 and one or more springs 162 bearing thereagainst.

In order to insure freedom from dust on the film means such as brushes 164 for removing particles adhering to the film. A pair of such brushes are shown, one for each side of the film and these may be directed at an angle to the film with their fibers pointing in the direction of motion thereof.

The roller system over which the film is guided may comprise rollers 166 positioned at various points so as to accommodate the desired length of film. In Figure 15 they are shown arranged to accommodate a film having eighty picture panels; for a shorter film they may be arranged similarly to the roller system of Figure 3, which shows an arrangement for a thirty panel film.

A combined guide and shield 168 is also shown in Figure 15; this may be similar to the shield 70 of Figure 3. While in the roller arrangement as shown in Figure 15 it is not in use, it will be found useful for shorter films.

The condenser 126 is illustrated in section on an enlarged scale in Figure 19. Besides the lenses 170 it comprises a heat absorbing disc 172 similar to the disc 73 described in connection with the first embodiment, and in addition I have shown a construction whereby the use of a screen such as the screen 22 of the first embodiment, intended to shield the condenser from the lamp is rendered unnecessary. For this purpose I have shown the rim portions 174 of the condenser frame 176 adjacent the lamp 124 turned inward and provided with a flange 178 projecting toward the lamp.

The details of the mounting of mirror 130 can best be seen in Figure 20. From this figure taken together with the other views, it will appear that it is adjustable in a horizontal direction toward or away from the projecting lens, as well as in a vertical direction and angularly. For this purpose it is shown as mounted on a backing 180 provided with end portions 182 which carry adjusting screws passing through arcuate slots 184 in a pair of angular uprights 186 which are slidably mounted on the upper plate 112, and for that purpose are shown as having their horizontal portions slotted at 188, the slots receiving screws 190 carried by the plate 112.

The mirror 132 is shown as adjustably mounted on the base plate 114. For this purpose its backing 191 is shown as hinged at 192 on a plate 194 that is adjustably mounted on the base plate 114; as by the screws 196 carried by the base plate and passing through slots 198 in the plate 194. The mounting is completed by extensible brackets 200 by means of which angular adjustment of the mirror can be effected.

The mirror 134 is shown mounted on a backing 202 that is carried by extensible brackets 204 and 206 by means of which it may be adjusted angularly and toward and away from the screen 136. If desired, provision may also be made for its vertical adjustments, as by the construction including bars 203 and 205 carrying the brackets 204 and 206 respectively and slidably mounted on the uprights 116, which are shown as slotted at 207 for that purpose.

The screen 136 may be of the same type as the screen 32, that is frosted on one side and semi-prismatic on its other side, although, it will be understood that other types may also be found suitable.

A clear idea of the optical system and its effect in throwing images from a standard film on the screen in an upright position may be obtained from Figure 16. In that figure, in which the optical parts have been numbered as heretofore, it is assumed that the image of the arrow $ab$ is to be thrown on the screen. The mirror 130 throws the rays from the lens 128 downwardly on the mirror 132. Rays from $a$ strike the mirror 130 at $a'$ and rays from $b$ at $b'$, and rays from $c$ (the axial point) at $c'$.

The corresponding points at which these respective rays strike the mirror 132 are shown at $a''$ and $b''$ and $c''$.

Mirror 132 directs the rays toward the mirror 134 which they strike at $a'''$, $b'''$ and $c'''$, respectively, and the latter in turn directs the rays to the screen 136 which they strike at the points A, B and C.

By following the course of the rays the effect of the mirrors in correctly positioning the image will become clear.

In order to shield the screen to some extent from overhead light, I have shown a shield 78 on the casing 10 of the first embodiment and a corresponding shield 206 on the casing of the second embodiment. These shields are shown positioned over the openings in the respective casings through which the screws are visible.

As an added convenience I have shown means 76 applied to the casing of the first embodiment into which a card or label may be inserted containing description matter, as indicated in Figure 1.

While I have herein disclosed two embodiments of my invention it will be understood that the same may be embodied in many other forms without departing from the spirit thereof, as will be obvious to those skilled in the art, and that the disclosures herein are to be interpreted as descriptive merely and not in a limiting sense, and that I do not limit myself other than as called for by the prior art.

Having thus described my invention and illustrated its use, what I claim as new and desire to secure by Letters Patent, is:

1. A projector comprising a casing, said casing being adapted to completely enclose the parts of said projector, and having a translucent projection screen in one wall thereof, the back of said casing being normally mounted on said casing but being readily removable and separable from said casing, and substantially all of the operating parts of the projector being mounted on said back and being removable from said casing therewith when said back is separated from the casing.

2. A projector comprising a casing, a frame adapted for insertion into said casing, and for ready separation therefrom, an optical projection system and a screen for receiving an image projected by said system, said projection system and said screen being carried on said frame and being positioned within the confines of said casing when the frame is inserted thereinto and means for holding said frame in fixed relation within said casing and permitting its ready removal therefrom.

3. In a projector comprising a light source, a condensing lens adapted to receive light from said source, said condensing lens having an outer generally cylindrical frame within which its lenses are seated, and said frame being provided with a shield in the form of an annular flange portion turned radially inward from the frame and an annular cylindrical portion projecting from said inturned portion toward the light source.

4. A projector comprising a casing open at the back, a panel removably mounted on said casing so as to close said casing at the back, a bracket mounted on said panel so as to project into said casing, an optical system mounted on said bracket, said system comprising a light source, a condenser adapted to receive and transmit light from said source, a projecting lens system adapted to receive light from said condenser, a guiding and actuating system for a projector film also mounted on said bracket, said system comprising a gate positioned between said condenser and said projecting lens, and a system of guide rollers for said film, and a motor for actuating one of said guide rollers also mounted on said bracket.

5. In a projector as set forth in claim 4, a translucent projection screen mounted in said casing, and a system of reflectors adapted to transmit images forming light rays from the projecting lens system to the screen, said system of reflectors also being mounted in said casing.

6. In a projector, a plane screen, a projecting lens positioned at a predetermined distance from said screen, said lens being only partially corrected for spherical aberration so that to produce an image on said plane screen sharply focused at all points thereof requires an object the points of which are disposed in a spherical surface of predetermined curvature and positioned at a predetermined distance from said lens, a guide surface for a film bearing a representation that is to be projected on the screen, said surface being cylindrically curved on a radius less than the radius of said spherical surface, and so positioned that marginal portions of the film within the object field lie on the side of said spherical surface toward said lens, while all of the middle portions of the film within the object field lie on the side of said spherical portion away from the lens, whereby a compensating effect is obtained that results in an appearance of uniformity of focusing.

7. In a projector, a plane screen, a projecting lens positioned at a predetermined distance from said screen, said lens being only partially corrected for spherical aberration so that to produce an image on said plane screen sharply focussed at all points thereof requires an object the points of which are disposed in a spherical surface of predetermined curvature and positioned at a predetermined distance from said lens, a guide surface for a film bearing a representation that is to be projected on the screen, said surface being cylindrically curved on a radius less than the radius of said spherical surface, and so positioned that portions of the film entering the object field and portions of the film leaving the object field lie on the side of said spherical surface toward said lens, while the intermediate portions of the film within the object field lie on the side of said spherical portion away from the lens, whereby a compensating effect is obtained that results in an appearance of uniformity of focussing.

8. In a projector, a plane screen, a projecting lens positioned at a predetermined distance from said screen, said lens being only partially corrected for spherical aberration so that to produce an image on said plane screen sharply focused at all points thereof requires an object the points of which are disposed in a spherical surface of predetermined curvature and positioned at a predetermined distance from said lens, a guide surface for a film bearing a representation that is to be projected on the screen, said surface being cylindrically curved on a radius less than the radius of said spherical surface, and so positioned that it intersects said spherical surface, whereby a compensating effect is obtained that results in an appearance of uniformity of focusing.

9. In a self contained projector, an outer casing open at the top, and having an opening in one side through which a projection screen inside the casing may be seen, a frame adapted for insertion into said outer casing from above, means for removably securing said frame in place within the casing, a translucent screen carried by said frame so positioned that it will be brought into opposition with said opening in said casing so as to close the opening when said frame is inserted into said casing, means for guiding and advancing a film carried by said frame, means for illuminating a portion of said film carried by said frame and means for projecting images of said illuminated portion carried by said frame, and a cover removably superposed over the open top of said casing.

10. In a projector having a projecting lens system, means for maintaining a portion of a film in the path of rays from said system with said film portion curved longitudinally of the film and straight transversely across the film, said means comprising an arrangement for engaging and guiding said film at two spaced fixed points, and means for guiding a portion of one surface of said film intermediate said points, said last named means being provided with guide surfaces for said film curved in a direction longitudinally of said film and positioned so as to engage said film in a region lying outside of a straight line joining said fixed points, and said film engaging arrangement having its film engaging portions spaced from said guiding means whereby said film is unsupported between said intermediate guiding means and said fixed points.

11. In a projector, a gate comprising a pair of similarly convexly curved guide surfaces spaced from each other so that each is adapted to engage one edge portion of one side of a film, and means for holding said film against said guide surfaces, said means comprising an arrangement for applying tension to the film at two points spaced from and on opposite sides of said guide surfaces, and in directions at an angle to each other and tangentially to said guide surfaces, whereby said film is unsupported intermediate said points and said guide surfaces and has the edge portions of one face thereof held against said guide surfaces.

12. In a projector, a gate convexly curved in the longitudinal direction of said film, and guide and advancing means for holding one side of said film against the said gate and for moving it thereover, said means comprising a braking device adapted to engage said film at a point spaced from one side of said gate and to exert a retarding force thereon directed along a line tangential to the curvature of said gate, and said means further comprising a device for intermittently advancing said film and holding it against movement, the advancing movement being effected by a pull on the film at a point spaced from the other side of said gate and directed along a line tangential to the curvature of said gate and at an angle to the line of action of said retarding force.

13. In a projector, a gate in the form of a rectangular frame comprising a pair of similar curved guide surfaces positioned in spaced parallel relation so as to be adapted to give a film having its edge portions pressed thereagainst a curvature in a longitudinal direction, and means connecting said surfaces, said means comprising a pair of relatively narrow bars extending between the opposed end portions of said surfaces transversely to a film on said gate and said bars having their faces offset from said guide surfaces whereby said faces will be spaced from the surface of a film on said guide surfaces, so that the only contact between said film and the gate is along the edge portions of said film.

MORRIS B. BECK.